US009041535B2

(12) United States Patent
Hamerly

(10) Patent No.: US 9,041,535 B2
(45) Date of Patent: May 26, 2015

(54) SIGNAL BLOCKING DETECTION IN OFFENDER MONITORING SYSTEMS

(71) Applicant: 3M INNOVATIVE PROPERTIES COMPANY, St. Paul, MN (US)

(72) Inventor: Michael E. Hamerly, Vadnais Heights, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 147 days.

(21) Appl. No.: 13/726,774

(22) Filed: Dec. 26, 2012

(65) Prior Publication Data

US 2014/0179342 A1    Jun. 26, 2014

(51) Int. Cl.
| G08B 1/08 | (2006.01) |
| H04W 4/02 | (2009.01) |
| G08B 21/02 | (2006.01) |
| G08B 29/04 | (2006.01) |
| G07C 9/00 | (2006.01) |

(52) U.S. Cl.
CPC ........... *H04W 4/025* (2013.01); *G08B 21/0269* (2013.01); *G08B 21/0286* (2013.01); *G08B 29/046* (2013.01); *G07C 9/00111* (2013.01); *H04B 17/101* (2015.01)

(58) Field of Classification Search
CPC .............................. G08B 21/0286; G08B 1/08
USPC ................. 340/539.22, 573.1, 573.4, 539.13; 455/404.2, 456.1
See application file for complete search history.

(56) References Cited

U.S. PATENT DOCUMENTS

| 3,163,861 | A | 12/1964 | Suter |
| 5,504,474 | A | 4/1996 | Libman et al. |
| 5,731,757 | A | 3/1998 | Layson, Jr. |
| 5,754,104 | A | 5/1998 | Saito |
| 5,831,535 | A | 11/1998 | Reisman et al. |
| 5,936,529 | A | 8/1999 | Reisman et al. |
| 6,111,503 | A | 8/2000 | Javitt |
| 7,215,241 | B2 | 5/2007 | Ghazarian |
| 8,018,371 | B1 | 9/2011 | Paschen |
| 8,395,513 | B2 * | 3/2013 | Moran et al. ................ 340/573.4 |
| 8,629,771 | B2 | 1/2014 | Anderson |
| 8,723,669 | B2 * | 5/2014 | Freathy .................... 340/539.13 |
| 2009/0104869 | A1 * | 4/2009 | Li ...................................... 455/1 |
| 2010/0090825 | A1 | 4/2010 | Freathy |
| 2010/0090826 | A1 | 4/2010 | Moran et al. |
| 2011/0050446 | A1 | 3/2011 | Anderson et al. |

FOREIGN PATENT DOCUMENTS

| EP | 2 290 391 | 3/2011 |
| JP | 2 576 759 | 11/1996 |

* cited by examiner

*Primary Examiner* — Toan N Pham
(74) *Attorney, Agent, or Firm* — Emily M. Van Vliet

(57) ABSTRACT

An electronic monitoring device for monitoring an individual and detecting signal blocking. The electronic monitoring device may be equipped with GPS and/or RF communication technology that may be interrupted intentionally or unintentionally. The device compares sampled incident energy with a reference level to identify an occurrence of blocking the transmitter signal. The device may also base determination of a signal blocking occurrence on input from a status detection module. Status information is also leveraged to intelligently calibrate the device to more robustly determine a tampering event.

24 Claims, 4 Drawing Sheets

SIGNAL BLOCKING DETECTION IN OFFENDER MONITORING SYSTEMS

TECHNICAL FIELD

The present disclosure relates to an electronic monitoring device for monitoring an individual, and particularly to detecting occurrences of signal blocking.

BACKGROUND

Electronic monitoring devices are used by many government and private entities to detect and monitor the location of individuals wearing or associated with an electronic monitoring device. Electronic monitoring devices provide a cost effective solution to overcrowding of jails or prisons, and are often used to allow non-violent offenders to transition to society during a parole period, after being incarcerated for a period of time. Such devices can ensure confinement of the offender or monitored person to a particular location, such as at the offender's place of residence or at a rehabilitating institution, and may also determine whether the individual enters any places he is not allowed, also referred to as exclusion zones.

Electronic monitoring devices typically use either radio frequency (RF) communication with a second device, or Global Positioning System (GPS) technology to confirm the location of a monitored person, either in an absolute sense as with GPS, or relative to the second device which the electronic monitoring device is in RF communication with. GPS technology has certain limitations. For example, in some environments the GPS signal may be lost or blocked in or by tall buildings or other structures with layers of steel and concrete. It would be advantageous to know whether an interrupted signal, whether RF or GPS, is due to environmental or geographical reasons, or due to deliberate attempts by individuals to disable monitoring capabilities. For the purpose of knowing where the monitored person is, electronic monitoring devices are often designed to be attached to a monitored person for monitoring the movements or other activities of the person. Such electronic monitoring devices often include a tamper sensor for sensing tampering with the device or removal of the device from the person to whom the device was attached. The electronic monitoring device may then produce a tamper signal which is transmitted to an external receiver.

Other devices have been designed to detect tampering with the signal, such as placing metal shielding around an electronic monitoring device. Such metal shielding could prevent the device from being able to transmit RF signals to or receive RF or GPS signals from other devices. United States Patent Application 2010/0090825 describes incorporating a metal detection circuit into an electronic monitoring device, and combining output from such a circuit with other factors such as loss of GPS signal and the level of gain provided in an automatic gain circuit (AGC) in a GPS receiver to determine whether shielding is occurring.

United States Patent Application 2010/0090826 describes a different method of detecting shielding. This application describes the use of an auxiliary device in combination with an electronic monitoring device. The auxiliary device is disposed in close proximity to the electronic monitoring device, and emits an RF signal detected by the electronic monitoring device. If the electronic monitoring device fails to receive the signal from the auxiliary device, such a failure is considered to be indicative of shielding or some other type of tamper.

Even in light of these methods of detecting shielding, advancements in this area, and improvements in accuracy of shielding detection would be welcomed.

SUMMARY

The present disclosure provides an electronic monitoring device and method for detecting blocking, wherein the blocking is not limited to blocking caused by metal. A separate antenna is provided in a device consistent with the present invention to sample incident energy. The incident energy is compared to a reference level to identify an occurrence of blocking. Such an approach reduces circuit complexity, manufacturing costs, and permits detection of a multitude of measured parameters by providing broadband blocking detection with the capability to focus the detection range within a desired bandwidth.

In one aspect, the present disclosure provides an electronic monitoring device for monitoring an individual and detecting blocking. The device comprising a communication module comprising a transmitter to transmit a radio frequency (RF) signal, a signal blocking detection module, and a comparator. The signal blocking detection module comprises an antenna and a signal detector. The antenna samples incident energy, the incident energy comprising at least one of energy transmitted by the transmitter, reflected energy, and environmental energy. The signal detector converts energy sampled by the antenna into a measured parameter and the comparator compares the measured parameter to a reference value or level to identify an occurrence of blocking the transmitter signal.

In another aspect of the present disclosure, an electronic monitoring device is provided for monitoring an individual and detecting signal blocking based on at least two parameters. The device comprises a communication module comprising a transmitter to transmit a radio frequency (RF) signal, a signal blocking detection module, a processor, and a status detection module. The status detection module comprises at least one of an accelerometer, a magnetometer, a gyroscope, a temperature sensor, or a pressure sensor. The signal blocking detection module comprises an antenna and a signal detector. The antenna samples incident energy comprising at least one of energy transmitted by the transmitter, reflected energy and environmental energy. The signal detector converts energy sampled by the antenna into a measured parameter. The processor compares the measured parameter to a reference level to identify a deviation from the reference level to determine whether signal blocking has occurred based on both the deviation and input from the status detection module.

In yet another aspect, the present invention provides an electronic monitoring device for monitoring an individual and detecting signal blocking using intelligent calibration. The device comprises a communication module comprising a transmitter to transmit a signal, a signal blocking detection module, and a comparator. The signal blocking detection module comprises an antenna and a signal detector. The antenna samples incident energy comprising at least one of energy transmitted by the transmitter, reflected energy and environmental energy. The signal detector converts energy detected by the antenna to a measured parameter. The comparator compares the measured parameter to a reference level to identify an occurrence of blocking the transmitter signal, and the reference level is a function of previously measured parameter.

BRIEF DESCRIPTION OF DRAWINGS

The invention may be more completely understood in consideration of the following detailed description of various embodiments of the invention in connection with the accompanying drawings, in which.

In the following description of the illustrated embodiments, reference is made to the accompanying drawings, in which is shown by way of illustration, various embodiments in which the invention may be practiced. It is to be understood that the embodiments may be utilized and structural changes may be made without departing from the scope of the present invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
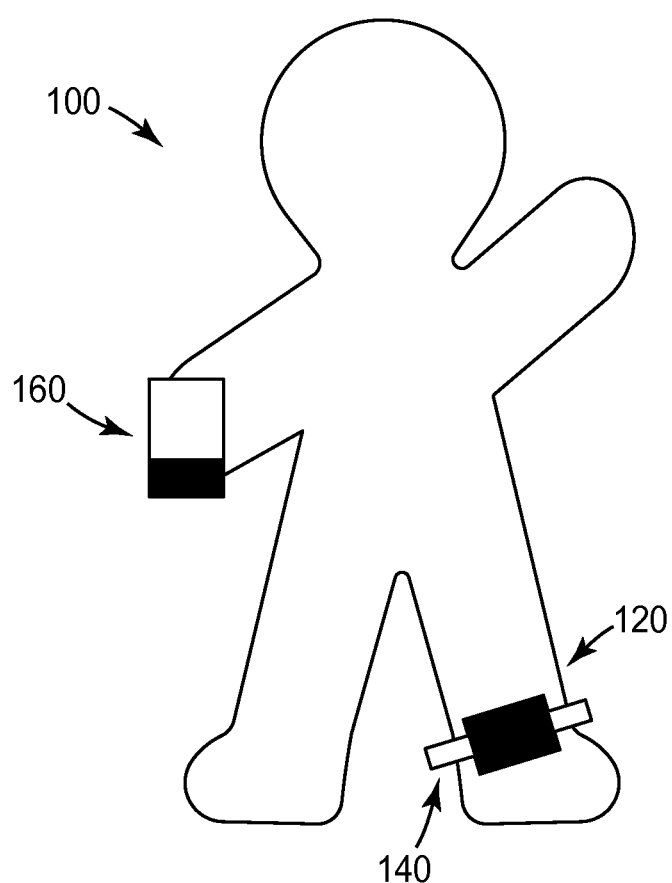
FIG. 1 shows an exemplary electronic monitoring device attached to an individual.
Figure 2:
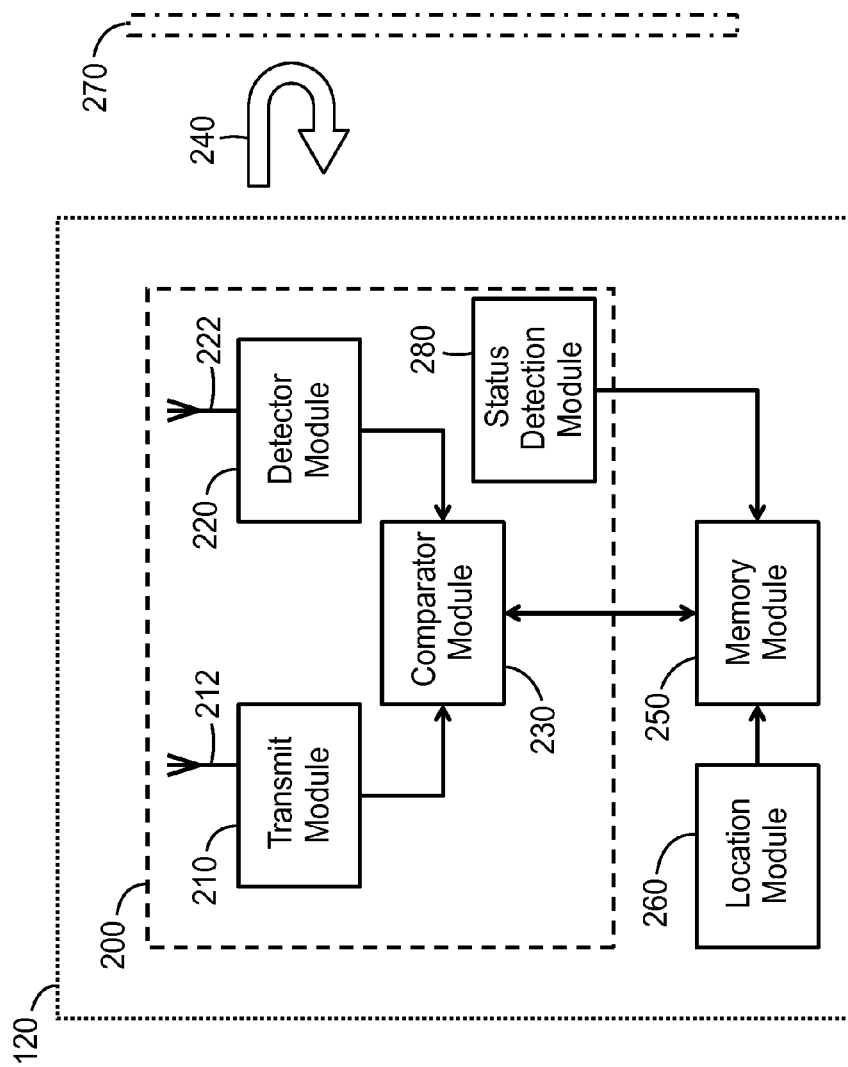
FIG. 2 shows a block diagram of a blocking detection module used in an electronic monitoring device.

FIG. 1 is a visual representation of an electronic monitoring device 120 worn by an individual 100. The individual 100 may be a released offender or other person requiring surveillance or monitoring such as a juvenile or child. A strap 140, attaches the electronic monitoring device 120 to the individual 100. The electronic monitoring device 120 and strap 140 may be attached to the wrist, arm, or connected to a belt of an individual 100. Various attachment mechanisms, other than strap 14, and placement of the electronic monitoring device 120 on the body will be apparent to one of skill in the art. Tamper detection mechanisms may be designed in the strap 140 and electronic monitoring device 120. U.S. Pat. Nos. 5,504,474; 5,731,757; 5,831,535; and 5,936,529 disclose tamper mechanisms for use with the electronic monitoring device 120 and strap 140 and are incorporated herein by reference. A handheld device 160 or other device such as a computer, PDA, home base unit, central monitoring system, or other processing machine communicates with the electronic monitoring device 120. Radio frequency signals are transmitted between the handheld device 160 and electronic monitoring device 120 through transmit circuitry or a communication module as represented in FIG. 2 and described further below. It will be easily appreciated by persons skilled in the art that other types of wireless communication techniques, such as infrared, may be used as well. Electronic monitoring device 120 may also include a location module for detecting the location of the monitored person by processing received GPS signals or through other location technologies, such as use of WIFI, zigbee or other technologies that will be apparent to one of skill in the art.

FIG. 2 illustrates a block diagram of a communication module 200 within the electronic monitoring device 120 to detect signal blocking in accordance with one embodiment of the present invention. Communication module 200 is operated or controlled by a processor, not shown, for processing information. The processor controls the modules on the electronic monitoring device 120. In some embodiments, multiple processors may control different modules. Communication module 200 includes a transmit module 210 and a transmit antenna 212. Transmit module 210 and antenna 212, cumulatively referred to as a transmitter, broadcast continuous or discrete, modulated or non-modulated radio frequency signals. Communication module 200 also includes a detector module 220, a detector antenna 222, and a comparator module 230. The transmit antenna 212 and the detector antenna 222 are distinct components and are physically separated from each other. The distance between the transmit antenna 212 and detector antenna 222 may be a numeric distance, for example, 1 mm, 5 mm, 10 mm or some other distance. In another configuration, the distance between the transmit antenna 212 and detector antenna 222 may be based on the wavelength and/or the power of a signal transmitted by the transmit antenna 212. For example, increased power in a signal transmitted by transmit antenna 212 may be associated with an increased distance between the antennas. The distance between the antennas may be, a fraction of a wavelength, for example, 0.002 of a wavelength of a transmitted signal or greater. In some embodiments, at least one of the transmit module 210, detector module 220, comparator module 230, and status detection module 280 may be separate from or outside communication module 200.

Contained with the detector module 220 is a signal detector, not shown, that converts incident energy 240 received by the detector antenna 222 into a measured parameter. At least one of the following measured parameters is calculated from incident energy 240: voltage, current, temperature, power, impedance, resistance, capacitance, or resonance. It will be apparent to one of skill in the art that other measured parameters may also be converted or derived from the incident energy 240. The detector module 220, with signal level detector, samples incident energy 240 over a period of time to compute the measured parameters. The incident energy 240 includes at least one of, but is not limited to: energy transmitted by the transmit module 210 through the transmit antenna 212, reflected energy due to the presence of a signal blocking, shielding, cancelling, jamming, or damping device 270, or environmental energy from other radio frequency generating sources such as cellular phones, microwaves, satellites, or personal communications services (PCS). The signal blocking, shielding, cancelling, jamming, or damping device 270 includes metallic, reflective or conductive material such as aluminum foil, or electronic radio frequency emitters such as cellular phones, pagers, walkie talkies, blue-tooth and wifi devices or other hand-held radio devices and the like. The comparator module 230 compares the converted and measured parameter obtained by the detector module 220 with a reference value or level stored in the memory module 250 of the electronic monitoring device 120. Reference levels or values may be predetermined and programmed into memory associated with detector module 220. Reference values or levels can be computed and stored when the transmit module 210 and detector module 220 operate without the presence of a signal blocking, shielding, cancelling, jamming, or damping device 270. The collected reference values or levels are stored within the memory module 250 and are accessed by the comparator module 230 to determine variation from the captured incident energy 240 converted into measured parameters. The measured parameters may be less or greater than the stored reference values or levels. If the presence of signal blocking, shielding, cancelling, jamming, or damping device 270 is detected because the computed values are less or greater than the stored reference values or levels, then the electronic monitoring device 120 will trigger an audio or visual alarm and store the detected event in the memory module 250. The stored detected blocking events may be accessed and analyzed at a later time. Reference values or levels are stored in RAM within the memory module 250. Other static or dynamic storage devices such as SRAM, DRAM, PROM or EEPROM may also be used for the memory module 250 and will be apparent to one of skill in the art. The results of the comparison by the comparator module 230 are also stored in the memory module 250 for intelligent calibration of the electronic monitoring device 120 and are used to trigger alarms or notifications. Intelligent calibration of electronic monitoring device 120 can include changing the stored reference level based on previously measured parameters so that the deviation from the reference level required to trigger an alarm is reduced or fine-tuned. Communication module 200 may also transmit information or an alarm related to such an event to an external device, such as a device carried by the monitored individual or a central monitoring system.

In one embodiment, electronic monitoring device 120 also includes a location module 260 for determining the current location of the individual 100. The location module communicates with a global position system (GPS) to obtain latitudinal and longitudinal or terrestrial coordinates. Operation of a location module, such as location module 260 for the electronic monitoring device 120 is described in U.S. Pat. No. 5,936,529 assigned to the present assignee. A status detection module 280 is also contained within the communication module 220. The status detection module 280 computes whether the communication module 220 within the electronic monitoring device 120 experiences changes in motion, temperature, or pressure and includes at least one of: an accelerometer, a magnetometer, a gyroscope, a temperature sensor, or a pressure sensor. The sensors described above, when used in combination with the detection module 220 are used to determine the presence of blocking, shielding, cancelling, jamming, or damping devices 270. For example, signal detector module 200 may include a gyroscope which indicates that electronic monitoring device 120 is undergoing significant acceleration, but yet signal detector module 220 detects a low level of incident energy when compared to the reference value. An alarm may be triggered because of the likelihood that the most recent GPS data is no longer relevant due to the acceleration detected and lack of recent location data due to an occurrence of signal blocking. The processor collects data on a continuous or periodic basis from the status detection module 280 and stores the information in the memory module 250. Information from the status detection module 280 is sent to the comparator module 230 with stored reference levels and measured parameters to determine the presence of blocking, shielding, cancelling, jamming, or damping devices 270.

Figure 3:
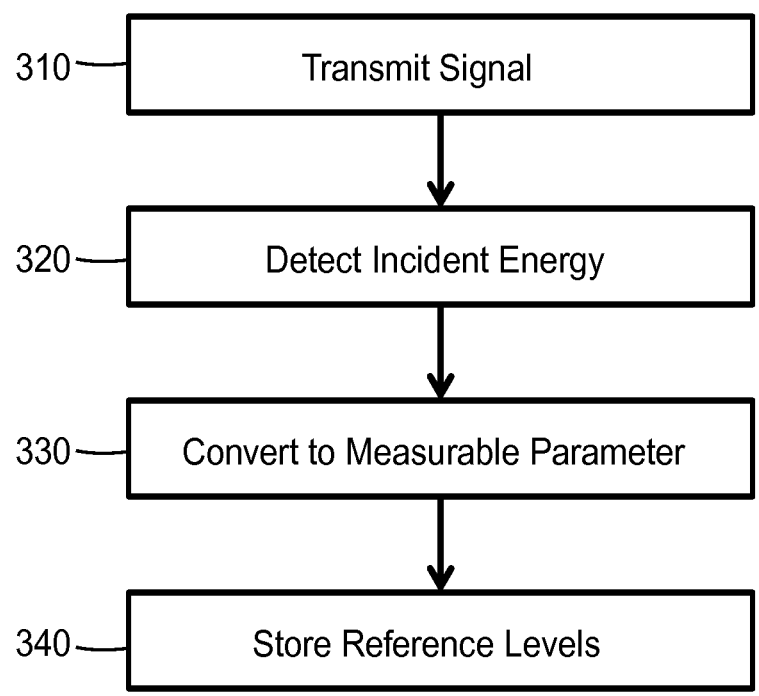
FIG. 3 as an illustrative flowchart of the communication module storing reference values or levels in an electronic monitoring device.

FIG. 3 as an illustrative flowchart of the communication module storing reference values or levels in an electronic monitoring device 120 without the presence of a blocking device. The represented steps are performed by the processor to store reference values or levels that are used to detect the presence of blocking, shielding, cancelling, jamming, or damping devices 270. At step 310, the processor commands the transmit module 210 to transmit a signal that exits the electronic monitoring device 120 through the transmit antenna 212. Incident energy 240 from the transmit antenna 212 and from environmental sources enters the electronic monitoring device 120 and is detected by the detector antenna 222 in step 320. The detector module 220, controlled by the processor, converts the incident energy 240 into a measured parameter in step 330 by using the signal detector. Measured parameters are sampled by the signal detector as magnitudes over a time period, or an average magnitude, or only the most recently captured measurement may be used. Other sampling rates or permutations will be apparent to one of skill in the art. The measured parameter may then be stored by the processor and used to determine future reference values or levels in the memory module 250 in step 340. The steps outlined in FIG. 3 are repeated to establish reference value or level baselines. The steps may be performed continuously with or without the presence of blocking, shielding, cancelling, jamming, or damping devices 270. Reference values or levels may be defined directly by currently received measured parameters, may be defined by previously measured parameters values or levels, or by any present or programmed values, or any combinations thereof with other data, such as aggregated third party measured parameters, or may be varied based on known temporal or environmental conditions. For example, the reference level during hours the monitored individual is expected to be at home may be different from the reference during times the monitored individual is expected to be at work. The current location of the electronic monitoring device 120 is also calculated by the location module 260 and stored in the memory module 250.

Figure 4:
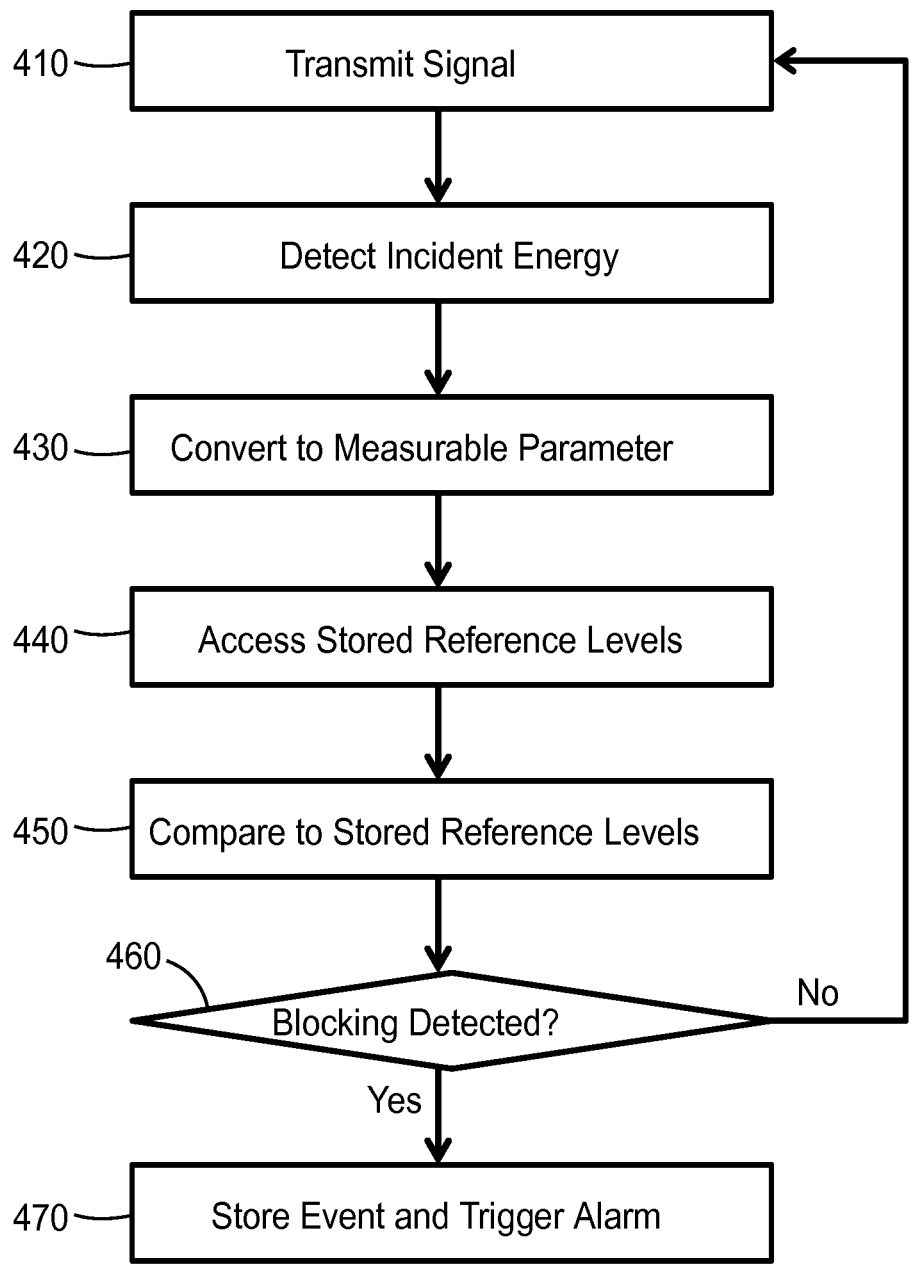
FIG. 4 is an illustrative flowchart of the communication module comparing detected signal levels to stored reference values or levels to determine an occurrence of blocking in an electronic monitoring device.

FIG. 4 is an illustrative flowchart of the communication module comparing detected signal levels to stored reference values or levels to determine an occurrence of blocking in an electronic monitoring device. The represented steps are performed by the processor to store reference values or levels that are used to detect the presence of blocking, shielding, cancelling, jamming, or damping devices 270. At step 410, the processor commands the transmit module 210 to transmit a signal that exits the electronic monitoring device 120 through the transmit antenna 212. Incident energy 240 from the transmit antenna 212 and from environmental sources enters the electronic monitoring device 120 and is detected by the detector antenna 222 in step 420. The detector module 220, controlled by the processor, converts the incident energy 240 into a measured parameter in step 430 by using the signal detector. Measured parameters are sampled by the signal detector as magnitudes over a time period, or an average magnitude, or only the most recently captured measurement may be used. Other sampling rates or permutations will be apparent to one of skill in the art. At step 440, the stored reference levels, and in some instances status detection module 280 sensor information are accessed from the memory module 250 by the processor. The converted measured parameters from the detector module 220 are compared against the retrieved information in step 450 by the processor in the comparator module 230. If the measured parameter is less than or greater than the stored reference level by a threshold deviation, then the presence of a blocking, shielding, cancelling, jamming, or damping device 270 was detected as defined in step 460. The event is stored in the memory module 250 and an alarm is triggered as outlined in step 470. If the presence of a blocking, shielding, cancelling, jamming, or damping device 270 was not detected as defined in step 460, then the processor instructs the communication module 220 to return to step 410 and transmit incident energy. The alarm is processed by the processor and triggers an audio or visual alert on the electronic monitoring device 120. The alert may be transmitted to the handheld device 160 to notify the individual that a blocking, shielding, cancelling, jamming or damping device 270 is within the presence of the electronic monitoring device 120. The alarm may be sent to another location for additional processing as is described in U.S. Pat. No. 5,936,529 assigned to the present assignee. The steps outlined in FIG. 4 are repeated to continuously detect the presence of blocking, shielding, cancelling, jamming, or damping devices 270. The current location of the electronic monitoring device 120 is also calculated by the location module 260 and stored in the memory module 250.

EXAMPLE 1

Electronic Monitoring Device Configuration

An electronic monitoring device is attached to the ankle of an offender by securely fastening the strap. The transmit module and antenna of the communication module, activated by the processor, transmit continuous radio frequency signals. Incident energy captured by the detector antenna and module is converted into voltage measurements over a twenty minute period of time. The voltage measurements are stored in the memory module of the electronic monitoring device creating an operational reference level without the presence of a blocking, shielding, cancelling, jamming, or damping device.

EXAMPLE 2

Electronic Monitoring Device Blocking Event

An offender with an electronic monitoring device attached to their ankle wraps the device in aluminum foil. The transmit module and antenna of the communication module, activated by the processor, transmit continuous radio frequency signals. Incident energy from the transmit module and antenna as well as incident energy reflected from the aluminum foil are captured by the detector antenna and module. Both transmitted and reflected incident energy are converted into voltage measurements by the processor in the detector module. The location module on the electronic monitoring device last indicated that the offender is located within their residence. Stored reference voltage measurements are accessed from the memory module by the comparator module and are compared to the detected voltage measurements. The comparator module determines that the voltage measurements are greater or less than the stored reference levels and activates an alarm. The alarm is transmitted to a handheld device carried by the offender to alert them of the blocking detection and the event is stored in the memory module.

EXAMPLE 3

Electronic Monitoring Device Blocking Intelligent Calibration

An offender with an electronic monitoring device attached to their ankle wraps the device in aluminum foil. The transmit module and antenna of the communication module, activated by the processor, transmit continuous radio frequency signals. Incident energy from the transmit module and antenna as well as incident energy reflected from the aluminum foil are captured by the detector antenna and module. Both transmitted and reflected incident energy are converted into voltage measurements by the processor in the detector module. The location module on the electronic monitoring device last indicated that the offender is located within their residence. However, an accelerometer in the electronic monitoring device indicates that the offender is in rapid motion or performing a task not representative of a person in a residence, such as acceleration or deceleration typically associated with driving. Stored reference voltage measurements as well as accelerometer data are accessed from the memory module by the comparator module and are compared to the detected voltage measurements and determined by a set of rules or an algorithm to be outside the parameters associated with someone inside their residence. These could be fixed rules or parameters, or values set as a result of longer term averages from the offender, or from values aggregated from multiple offenders' data to establish changing limits. These reference values could be further modified by environmental conditions such as season, geographical location, age of the offender, etc. The comparator module determines that the voltage measurements are greater than the stored reference levels and that movement is greater than anticipated and an alarm is activated because a blocking event was detected. The alarm is transmitted to a handheld device carried by the offender to alert them of the blocking detection and the event is stored in the memory module.

What is claimed is:

1. An electronic monitoring device for monitoring an individual and detecting blocking, the device comprising:
   a communication module comprising a transmitter to transmit a radio frequency (RF) signal, a signal blocking detection module, and a comparator;
   wherein the signal blocking detection module comprises an antenna and a signal detector;
   wherein the antenna samples incident energy, the incident energy comprising at least one of: energy transmitted by the transmitter, reflected energy, and environmental energy;
   wherein the signal detector converts the energy sampled by the antenna into a measured parameter; and
   wherein the comparator compares the measured parameter to a reference level to identify an occurrence of blocking the transmitter signal.

2. The electronic monitoring device of claim 1, wherein the measured parameter is at least one of: voltage, current, temperature, power, impedance, resistance, capacitance, inductance and resonance.

3. The electronic monitoring device of claim 1, further comprising a strap to secure the device to the limb of the individual, the strap having at least one tamper mechanism.

4. The electronic monitoring device of claim 1, further comprising a location module for detecting a current location of the electronic monitoring device.

5. The electronic monitoring device of claim 1, wherein the transmitter and the antenna of the signal blocking detection module are physically separated.

6. The electronic monitoring device of claim 1, wherein an occurrence of blocking the transmitter signal includes at least one of: shielding, cancelling, jamming and damping the transmitter signal.

7. The electronic monitoring device of claim 1, wherein when the device identifies an occurrence of blocking, the transmitter transmits a signal to a handheld device carried by the individual or to a remote location.

8. An electronic monitoring device for monitoring an individual and detecting signal blocking based on sampled incident energy and at least one other parameter, the device comprising:
   a communication module comprising a transmitter to transmit a radio frequency (RF) signal, a signal blocking detection module; a processor, and a status detection module comprising at least one of: an accelerometer, a magnetometer, a gyroscope, a temperature sensor, and a pressure sensor;
   wherein the signal blocking detection module comprises an antenna and a signal detector;
   wherein the antenna samples incident energy, the incident energy comprising at least one of: energy transmitted by the transmitter, reflected energy and environmental energy,
   wherein the signal detector converts energy sampled by the antenna to a measured parameter;
   wherein the processor compares the measured parameter to a reference level to identify a deviation from the reference level to determine whether signal blocking has occurred based on both the deviation and input from the status detection module.

9. The electronic monitoring device of claim 8, wherein the measured parameter is at least one of: voltage, current, temperature, power, impedance, resistance, capacitance, inductance and resonance.

10. The electronic monitoring device of claim 8, further comprising a strap to secure the device to a limb of an individual, the strap having at least one tamper mechanism.

11. The electronic monitoring device of claim 8, further comprising a location module for detecting a current location of the electronic monitoring device.

12. The electronic monitoring device of claim 8, wherein the transmitter and the antenna of the signal blocking detection module are physically separated.

13. The electronic monitoring device of claim 8, wherein an occurrence of blocking the transmitter signal includes at least one of: shielding, cancelling, jamming and damping the transmitter signal.

14. The electronic monitoring device of claim 8 wherein when the device identifies an occurrence of blocking, the transmitter transmits a signal to a handheld device carried by the individual or to a remote location.

15. An electronic monitoring device for monitoring an individual and detecting signal blocking using intelligent calibration, the device comprising:
 a communication module comprising a transmitter to transmit a signal, a signal blocking detection module, and a comparator;
 wherein the signal blocking detection module comprises an antenna and a signal detector;
 wherein the antenna samples incident energy, the incident energy comprising at least one of: energy transmitted by the transmitter, reflected energy and environmental energy;
 wherein the signal detector converts the energy detected by the antenna to a measured parameter;
 wherein the comparator compares the measured parameter to a reference level to identify an occurrence of blocking the transmitter signal;
 wherein the reference level is a function of previously measured parameters.

16. The electronic monitoring device of claim 15, wherein the measured parameter is at least one of: voltage, current, temperature, power, impedance, resistance, capacitance, inductance and resonance.

17. The electronic monitoring device of claim 15, further comprising a strap to secure the device to a limb of the individual, the strap having at least one tamper mechanism.

18. The electronic monitoring device of claim 15, further comprising a location module for detecting a current location of the electronic monitoring device.

19. The electronic monitoring device of claim 15, wherein the transmitter and the antenna are physically separated.

20. The electronic monitoring device of claim 15, wherein an occurrence of blocking the transmitter signal includes at least one of: shielding, cancelling, jamming and damping the transmitter signal.

21. The electronic monitoring device of claim 15, wherein the transmitter transmits a signal to a handheld device carried by the individual or to a remote location.

22. The electronic monitoring device of claim 15, wherein the reference level is further varied based on at least one other known condition.

23. The electronic monitoring device of claim 22, wherein the known conditions include at least one of: environmental and temporal conditions.

24. The electronic monitoring device of claim 15, wherein the reference level is further varied based on third party measured parameters, including measured parameters aggregated from electronic monitoring devices from other individuals.

* * * * *